United States Patent [19]

McIntosh

[11] Patent Number: 4,471,861
[45] Date of Patent: Sep. 18, 1984

[54] SPEED AND TEMPERATURE RESPONSIVE DRIVE APPARATUS

[75] Inventor: Arthur M. McIntosh, Arlington Heights, Ill.

[73] Assignee: Borg-Warner Corporation, Chicago, Ill.

[21] Appl. No.: 308,641

[22] Filed: Oct. 5, 1981

[51] Int. Cl.³ .................. F16D 43/25; F16D 13/36; F16D 43/24

[52] U.S. Cl. ................... 192/82 T; 192/83; 192/85 F; 192/88 A; 192/91 A; 192/104 F

[58] Field of Search ............ 192/83, 82 T, 104 F, 192/104 R, 91 A, 70.27, 85 F, 88 A

[56] References Cited

U.S. PATENT DOCUMENTS

| | | | |
|---|---|---|---|
| 2,555,772 | 6/1951 | Wickware | 192/88 A X |
| 3,059,745 | 10/1962 | Tauschek | 192/104 F X |
| 3,221,721 | 12/1965 | Kuze | 192/82 T X |
| 3,580,229 | 5/1971 | May | 192/82 T X |
| 4,081,066 | 3/1978 | Ryba | 192/82 T |
| 4,290,393 | 9/1981 | Hart | 123/41.12 |
| 4,412,605 | 11/1983 | Deem et al. | 192/82 T |

FOREIGN PATENT DOCUMENTS

| | | | |
|---|---|---|---|
| 1216033 | 5/1966 | Fed. Rep. of Germany | 192/82 T |
| 2453562 | 5/1976 | Fed. Rep. of Germany | 192/82 T |
| 2804557 | 8/1979 | Fed. Rep. of Germany | 192/82 T |

OTHER PUBLICATIONS

A Copper Alloy's "Memory" Helps Conserve Energy, Feb. 1980 issue of INCRA, published by the International Copper Research Association.

*Primary Examiner*—Rodney H. Bonck
*Assistant Examiner*—David D. House
*Attorney, Agent, or Firm*—Julian Schachner

[57] ABSTRACT

Speed and temperature responsive drive apparatus includes a friction clutch which may be interposed between a vehicle engine and its associated cooling system fan. The clutch is biased toward engagement by a conventional spring and also by a thermal spring. A bladder develops a centrifugal pressure upon rotation of the apparatus, which pressure relieves the biasing forces of both springs.

10 Claims, 4 Drawing Figures

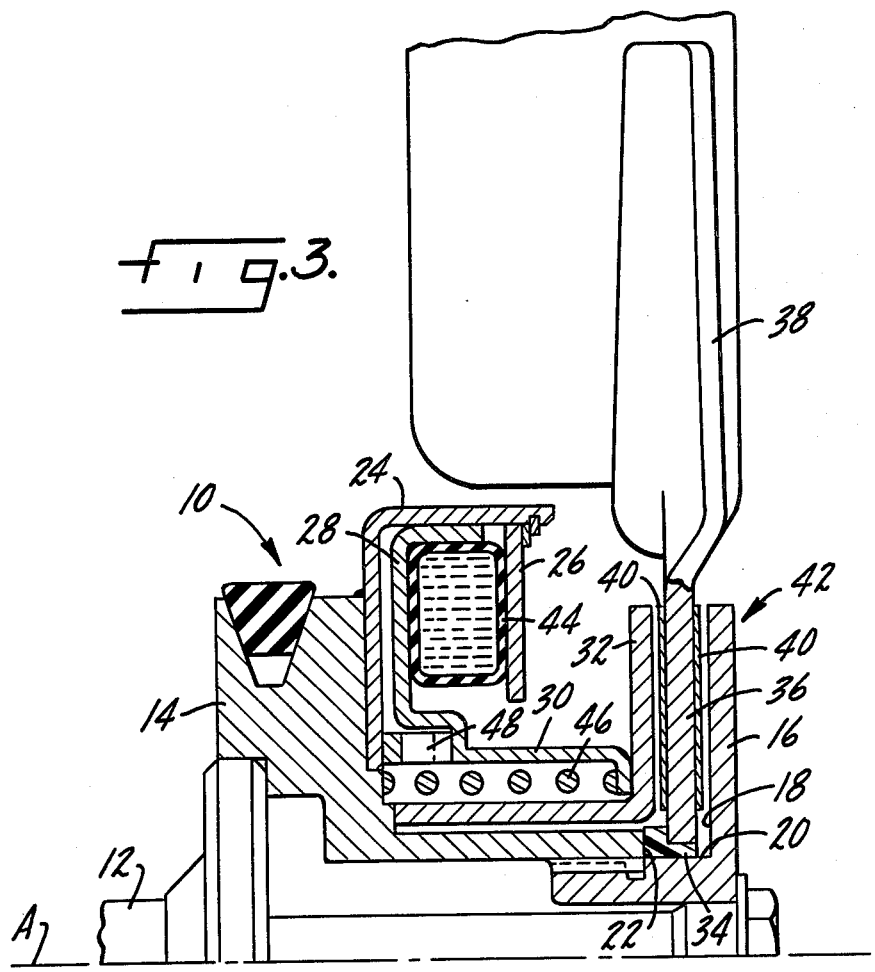
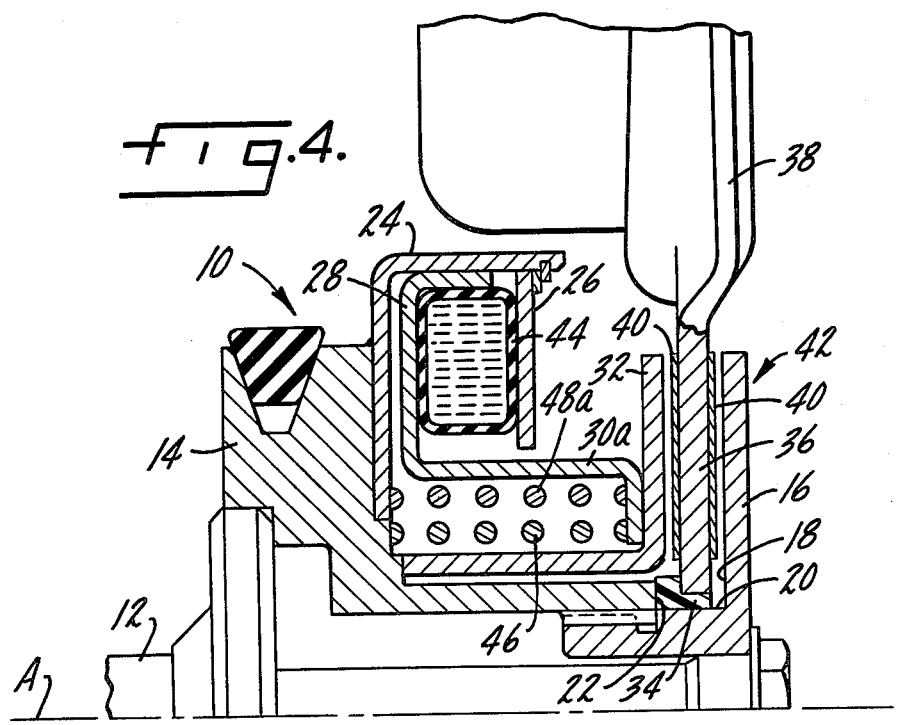

SPEED AND TEMPERATURE RESPONSIVE DRIVE APPARATUS

BACKGROUND OF THE INVENTION

This invention relates generally to drive apparatus associated with vehicle accessories or the like. More particularly it relates to a speed and temperature responsive clutch for controlling the fan associated with the cooling system of an internal combustion engine.

Power losses would be significant if a fan were driven directly by a vehicle engine, as the power input for the fan is an exponential function of its rotational speed. Furthermore, at high speeds the fan would deliver more air than is required for cooling the engine. This would lead both to excessive cooling and objectionable noises.

In order to avoid these disadvantages, it has been suggested that a separate electric fan motor be provided, or that the fan itself have adjustable blades. It has also been suggested that a viscous clutch connection be provided between the engine and the fan. These suggestions generally have technical, operational or price disadvantages.

A mechanical friction clutch also has been suggested for use in driving a cooling system fan. However, where it is necessary or desirable that such a clutch be both speed and temperature responsive, it has in general proven to be impractical due to the structural relationships which are necessary for the provision of this automatic feature.

There remains a need in the art for drive apparatus which is both speed and temperature responsive, which operates automatically, and which is simple, reliable and inexpensive.

SUMMARY OF THE INVENTION

This invention is directed to drive apparatus which meets this need. The drive apparatus incorporates a friction clutch which may be interposed between a vehicle engine and its associated cooling system fan. The clutch is biased toward an engaged position both by a conventional spring and by a thermal spring formed from a shape memory effect (SME) material. A bladder filled with fluid, powdered metal or the like develops a centrifugal pressure which relieves the biasing force of both the conventional and thermal springs.

In summary, the invention is directed to apparatus comprising a clutch having engaged and disengaged conditions, and control means for the clutch. The control means includes means providing a force biasing the clutch toward one condition, speed responsive means for relieving the biasing force, and temperature responsive means for modulating the speed at which the biasing force is relieved.

BRIEF DESCRIPTION OF THE DRAWINGS

The objects and advantages of this invention will become apparent to those skilled in the art upon careful consideration of the specification herein, including the drawings wherein:

FIG. 3 is a sectional view, similar to FIG. 1, of the drive apparatus in the disengaged condition; and FIG. 4 is a sectional view, similar to FIG. 2, of a modified form of the drive apparatus in the disengaged condition.

Figure 1:
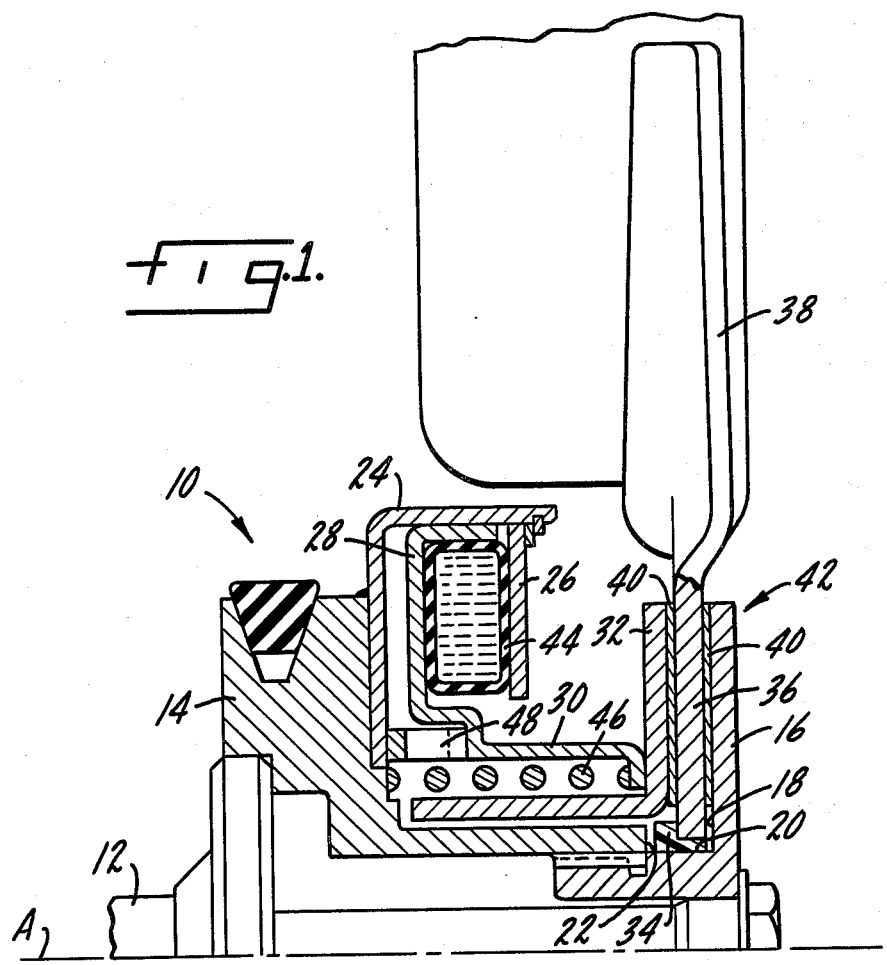
FIG. 1 is a sectional view of the drive apparatus in the engaged condition.

While this invention is susceptible of embodiment in many different forms, a preferred embodiment shown in the drawing will be described in detail. It should be understood that the present disclosure is considered to be an exemplification of the principles of the invention, and is not intended to limit the invention to this embodiment.

DESCRIPTION OF A PREFERRED EMBODIMENT

Referring to FIGS. 1 and 3 in further detail, there is shown an accessory drive apparatus 10 which is driven by an engine crankshaft 12 rotatable on an axis A. Drive apparatus 10 includes a body 14 which, if desired, may define a water pump pulley. Body 14 includes a fixed front clutch member 16 which defines a rearwardly facing surface 18 and an annular bearing surface 20. Body 14 defines a forwardly facing bearing surface 22.

Body 14 also includes a cylinder 24 having a reaction plate 26 secured thereto. A piston 28 is slidably received in cylinder 24. Piston 28 includes a forwardly extending arm 30 to which a movable rear clutch member 32 is rigidly secured so as to be slidable therewith.

A hub 34 is piloted on surface 20 and is spaced from surfaces 18 and 22. In a preferred form of the invention, hub 34 is formed from a low friction material. Extending outwardly from hub 34 is an element 36 supporting a fan 38. A suitable friction disc 40 is interposed between fixed member 16 and element 36. Another suitable friction disc 40 is interposed between movable member 32 and element 36. Members 16 and 32, hub 34, element 36 and discs 40 together form a friction clutch 42.

An annular bladder 44 is located between reaction plate 26 of cylinder 24 and piston 28. In a preferred form of the invention, bladder 44 is formed from a flexible material. If desired, this may be a silicone material. Bladder 44 is filled with a fluid, powdered metal or other suitable material which will develop a centrifugal pressure upon rotation of drive apparatus 10 on axis A.

A conventional coil spring 46 biases piston 28, arm 30 and movable member 32 forwardly and thus biases clutch 42 toward its engaged condition. A thermal leaf spring 48 similarly biases clutch 42 toward its engaged condition. In a preferred form of the invention, thermal spring 48 is formed from a bimetal, SME material or the like so as to be temperature responsive. The temperature responsive characteristics of SME materials are discussed in an article entitled "A Copper Alloy's 'Memory' Helps Conserve Energy" in the February, 1980 issue of INCRA, a publication of the International Copper Research Association. Suffice to say that a spring formed from such a material has a spring force which varies as a function of temperature. One such material might be an SME alloy containing roughly 70% copper plus zinc and small amounts of aluminum.

Figure 2:
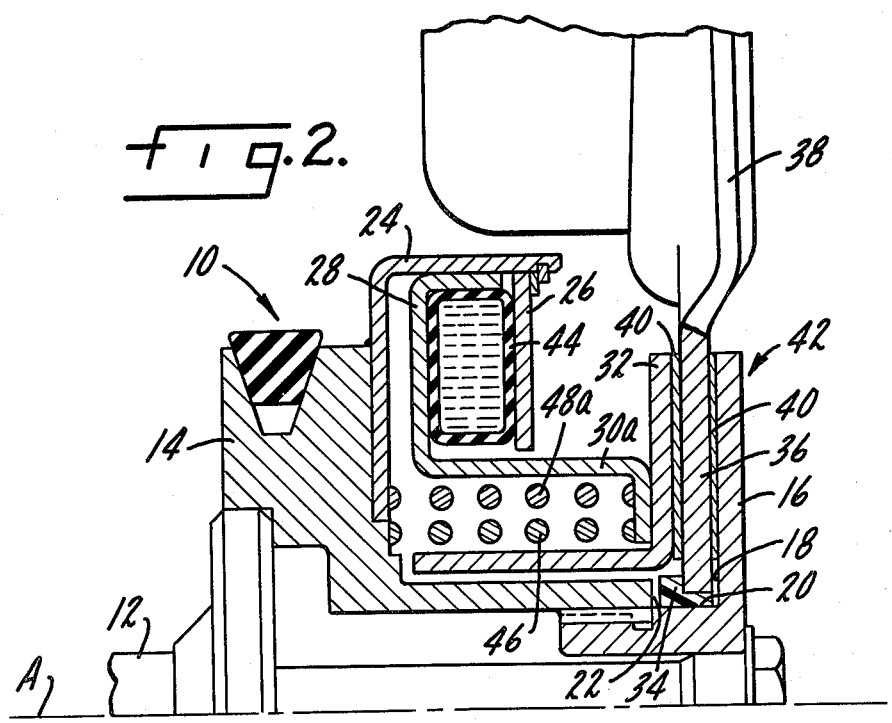
FIG. 2 is a sectional view of a modified form of the drive apparatus in the engaged condition.

A modified form of drive apparatus 10 is shown in FIGS. 2 and 4. Thermal leaf spring 48 has been replaced by a thermal coil spring 48a which is similar in configuration to conventional coil spring 46. Forwardly extending arm 30 of piston 28 has been modified as indicated at 30a to accommodate thermal spring 48a.

As shown in FIGS. 1 and 2, drive apparatus 10 is rotating at a relatively low speed (for example, engine idle speed) on axis A. The centrifugal pressure within bladder 44 is relatively low, and thus clutch 42 is engaged due to the biasing forces of conventional spring 46 and thermal spring 48, or 48a. Fan 38 is driven.

As engine speed increases, centrifugal pressure is built up within bladder 44. This pressure causes piston 28, arm 30, and 30a movable member 32 to slide rearwardly. This in turn compresses springs 46 and 48, 48a such that their biasing forces on clutch 42 are relieved, and it is disengaged (FIGS. 3 and 4). If the vehicle is moving in the forward direction, the ram effect of air blowing across fan 38 will slide hub 34 rearwardly into abutment with surface 22, thus ensuring complete separation of element 36 from fixed member 16 and movabale member 32.

As engine speed decreases, centrifugal pressure within bladder 44 decreases correspondingly until the biasing forces of springs 46 and 48, 48a are sufficient to re-engage clutch 42, at which point fan 38 again is driven.

An engineer has wide latitude in designing drive apparatus 10. Its operating characteristics will be affected by the size and shape of bladder 44, the material from which it is formed and the specific gravity of the material within it. Similarly the spring rate of springs 46 and 48, 48a will affect operating characteristics, as will the material from which thermal spring 48, 48a is formed.

The drive apparatus disclosed herein is both speed and temperature responsive. A movable clutch member is shifted under the influence of centrifugal force to relieve the biasing force tending to engage the clutch. The biasing force itself is temperature modulated, as the biasing force of thermal spring 48, 48a changes in accordance with the spring deformation resulting from temperature changes. Thus the drive apparatus is both speed and temperature responsive.

It is apparent that although the invention as disclosed herein provides a novel arrangement for controlling a cooling system fan, it is readily adaptable for use in other environments where similar operating characteristics may be desired. One such environment, for example, might be the control of a variable pulley.

It should be understood that while a preferred embodiment of the invention has been shown and described, this is to be considered as illustrative and may be modified by those skilled in the art. It is intended that the claims herein cover all such modifications as may fall within the spirit and scope of the invention.

What is claimed is:

1. Apparatus comprising a clutch having engaged and disengaged conditions, and control means for said clutch, said control means including means providing a force biasing said clutch toward one condition, speed responsive means for relieving said biasing force, and temperature responsive means for modulating the speed at which said biasing force is relieved.

2. The apparatus of claim 1, said biasing means including a conventional spring providing a force biasing said clutch toward its engaged condition.

3. The apparatus of claim 2, said temperature responsive means including a thermal spring providing another force biasing said clutch toward its engaged condition.

4. The apparatus of claim 3, said clutch including a movable member, said conventional and thermal spring forces acting upon said movable member to bias said clutch toward its engaged condition, and said speed responsive means moving said movable member in opposition to said conventional and thermal spring forces to relieve said bias.

5. The apparatus of claim 4, said clutch including a fixed member, and an element between said members, said element being movable away from said fixed member when said bias is relieved, and means for limiting said movement of said element.

6. The apparatus of claim 1, 2, 3, 4 or 5, said speed responsive means including a bladder in which a centrifugal pressure is developed for relieving said biasing force.

7. Apparatus comprising a body rotatable on an axis, said body including a fixed member and a cylinder, a piston slidable axially relative to said cylinder, said piston including a movable member slidable axially relative to said fixed member, conventional and thermal springs biasing said movable member toward said fixed member, and a bladder in said cylinder, said apparatus being constructed and arranged such that a centrifugal pressure is developed in said bladder upon rotation of said body, said pressure tending to slide said piston and movable member away from said fixed member against the biasing forces of said springs.

8. The apparatus of claim 7, an element between said members, said element being slidable relative to said fixed member.

9. The apparatus of claim 8, said element being journalled on said body and being slidable axially away from said fixed member to a limited extent upon sliding of said movable member away from said fixed member.

10. The apparatus of claim 9, said body limiting the extent of said sliding of said element away from said fixed member.

* * * * *